Aug. 26, 1930.                E. J. SWEETLAND                 1,774,044
            FILTER CASING AND PROCESS OF OPERATING THE SAME
                    Filed Oct. 28, 1925      6 Sheets-Sheet 3

Fig. 3.

INVENTOR
ERNEST J. SWEETLAND
BY
ATTORNEYS.

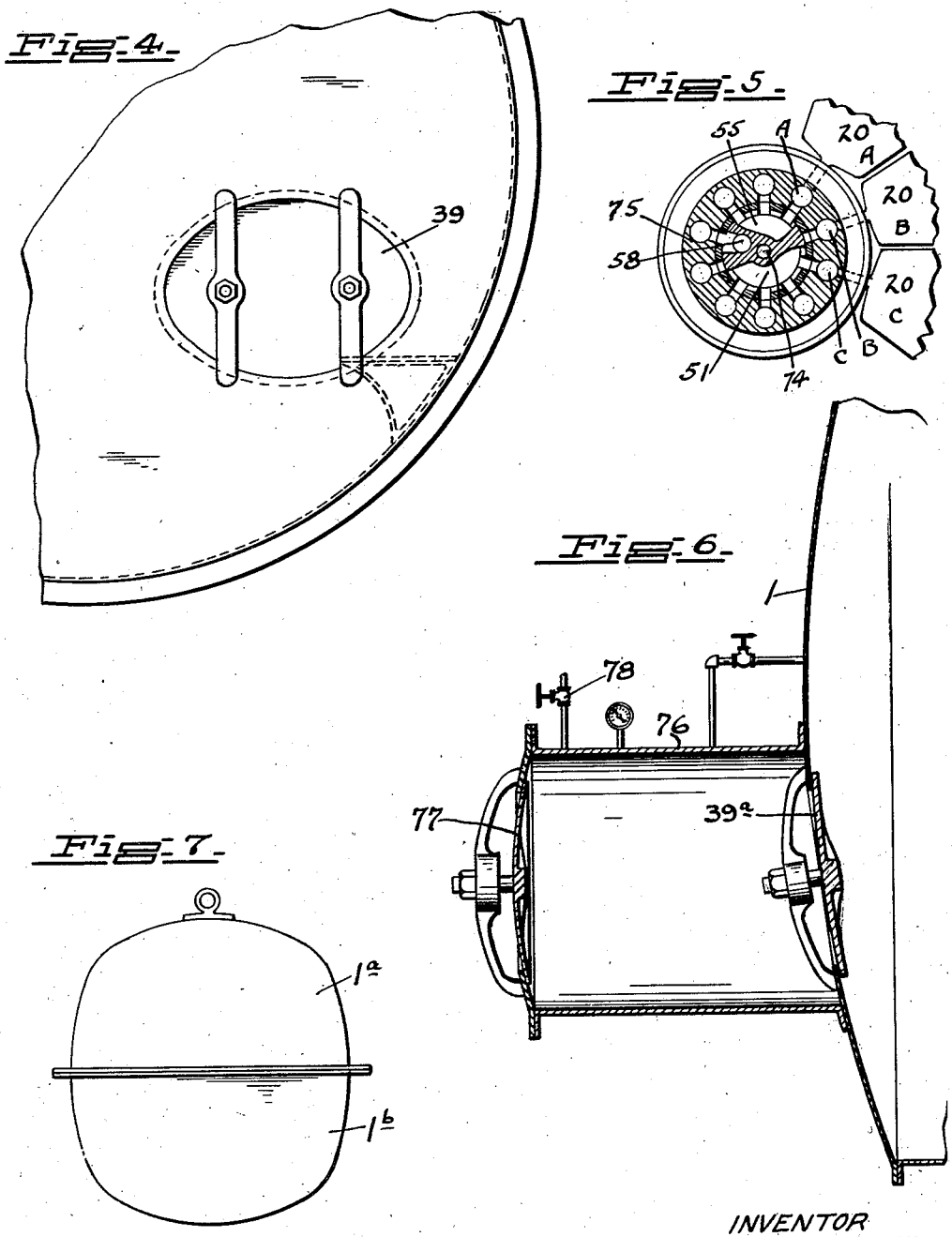

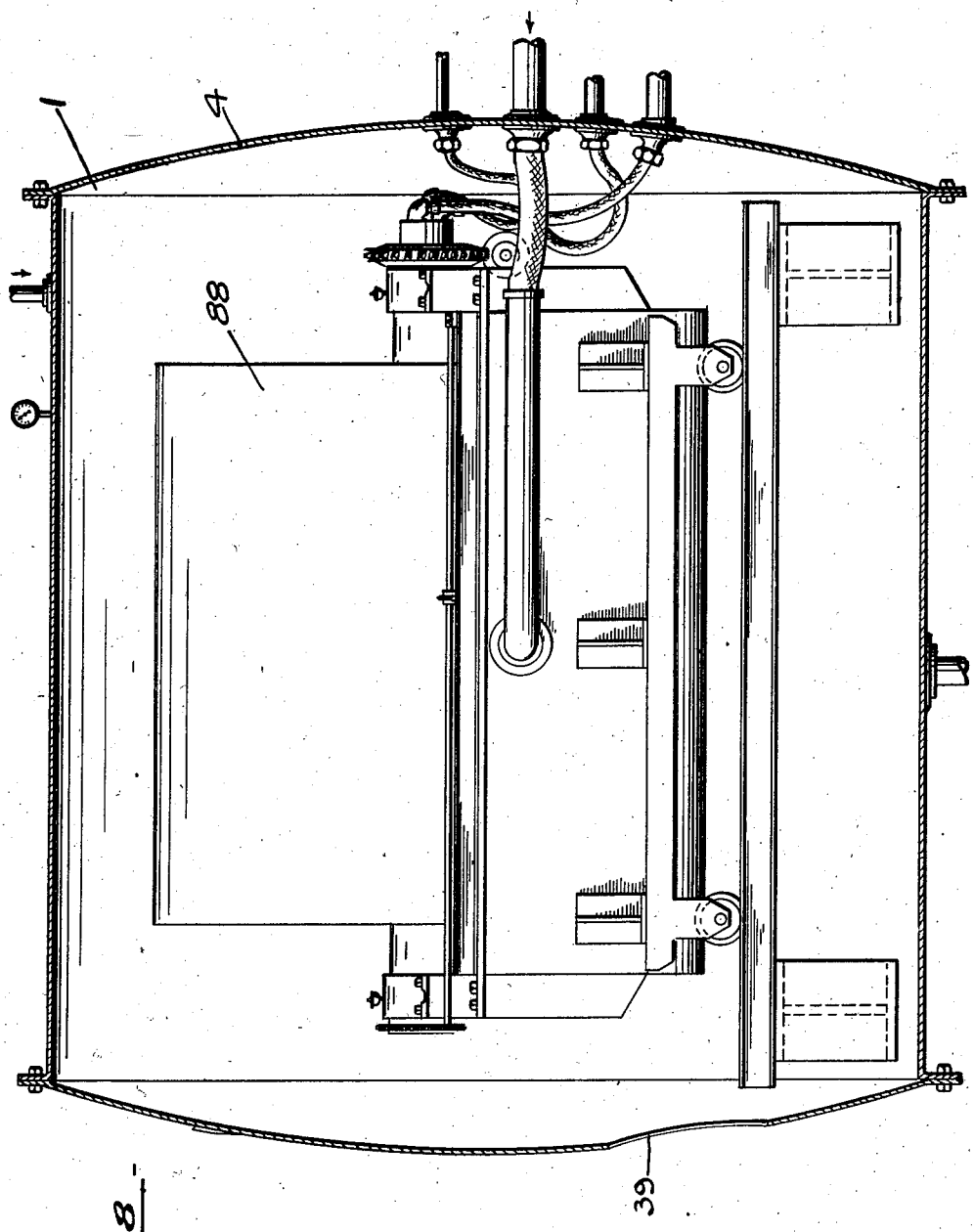

Aug. 26, 1930.   E. J. SWEETLAND   1,774,044
FILTER CASING AND PROCESS OF OPERATING THE SAME
Filed Oct. 28, 1925   6 Sheets-Sheet 6
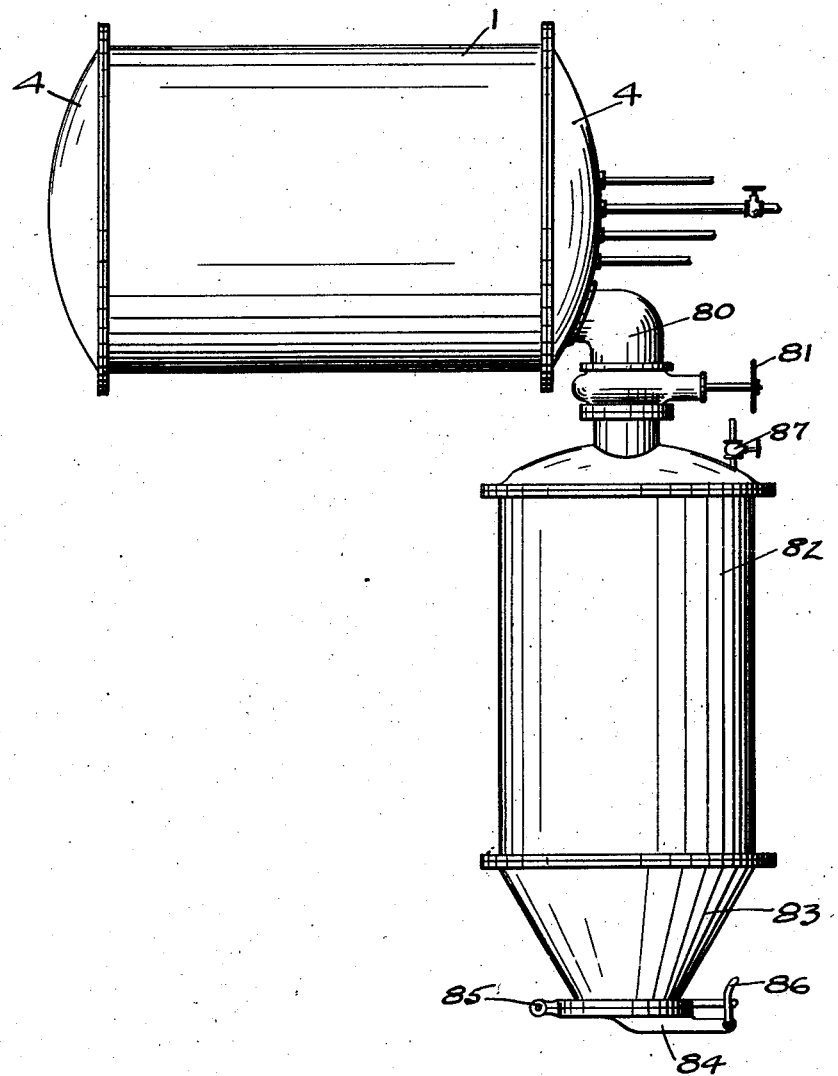
INVENTOR
ERNEST J. SWEETLAND
BY
ATTORNEYS.

Patented Aug. 26, 1930

1,774,044

UNITED STATES PATENT OFFICE

ERNEST J. SWEETLAND, OF HAZLETON, PENNSYLVANIA

FILTER CASING AND PROCESS OF OPERATING THE SAME

Application filed October 28, 1925. Serial No. 65,292.

The present invention relates to a method and apparatus for use in conjunction with that class of filters commonly known as the vacuum filters, or suction filters, and is particularly applicable to the continuous types of filters known in the trade as the American continuous filter; and the drum type of filter, of which type the so called Oliver filter is representative.

It should be clearly understood that my invention relates entirely to the casing or housing and to the method of operating same and I do not claim the invention of the details of the filters herein shown and described for the purpose of illustrating typical uses of my invention; nor do I wish to be limited in the use of my invention to the specific types of filters herein described, for the filter casing or housing may be employed in conjunction with any type of filter wherein its use may be found advantageous.

I am aware of the fact that efforts have been made to build continuous rotating drum filters and continuous rotating disc filters in such a manner that the filter is operated under a pressure greater than atmospheric pressure. These efforts, however, have been along entirely different lines from the present invention and have involved a highly special design of filter, the very nature of which has made them very expensive in construction and in many particulars objectionable from a standpoint of accessibility and convenience in making adjustments, repairs and replacements.

An outstanding advantage of the method and apparatus described herein resides in the fact that the invention may be applied to any standard type of vacuum or suction filter now in use without making any important changes or modifications, and by the use of the invention the capacity of such filters may be increased from 200 to 500 per cent.

A further advantage of the invention is that the purchaser of a drum or disc type of suction filter may use his filter alternately as a suction or pressure filter at his pleasure without any changes in the filter construction.

The advantages from the standpoint of first cost are at once obvious. In many cases one filter unit operated under a pressure of say 50 pounds per square inch may do the work of four units of similar size operated by suction. Assuming each unit to cost $10,000.00 the required filters operated by suction would cost $40,000.00 whereas when the present invention is employed a single unit costing $10,000.00 plus a suitable casing at a cost of say $3,000.00 will do the work, with a resultant saving of $27,000.00 in installation cost, in addition to the saving in floor space, cost of supervision, etc.

A further advantage lies in the fact that cost of supervision, maintenance, repairs, depreciation, etc. are naturally much less with one unit than with a plurality of units of the same size.

A still further advantage is that many materials which are not at present amenable to filtration in suction type filters could successfully be used with the same type of filter when employed in conjunction with the casing herein described. For example at the present stage of the art the first carbonation juices in beet sugar factories cannot successfully be filtered with any type of suction filter because the capacity of such filters on beet sugar juices is so low that an installation of continuous suction filters becomes inordinately expensive. Furthermore the cake formed with this material on continuous suction filters is so thin that it is difficult to discharge from the filter cloth. The result is that in present practice no attempts are made to handle the juices in continuous suction filters until the juice has first been put through a preliminary filtering or thickening process. But by the use of the pressure casing herein described the first carbonation juices may be filtered directly upon the present types of suction filters without any preliminary treatment and with a very reasonable cost of installation and operation.

A further advantage of my invention resides in the fact that the purchaser of a filter casing of the type described is not confined to the use of any particular type of suction filter. The casing when once purchased is a permanent asset and may be used in conjunction with any type of suction filter, and the filter may be replaced by a new one either of the same type, or by a filter of different type after the first one has been worn out, or for any other reason discarded.

Another advantage is that the filter may if desired be conveniently removed from this casing for repairs or replacements, and in the event that extensive repairs or a general overhauling becomes necessary a substitute filter may be operated in its place during the interim and production thus maintained.

Another advantage of my invention is that a suitable lock is provided whereby a workman may enter the casing to make minor repairs or adjustments, or to study the operation of the filter, without reducing the pressure within the chamber and without interruption to the operation of the filter.

Referring to the drawings, Fig. 1 shows a transverse section of the casing taken approximately at 2—2 of Fig. 2 and represents an American type of filter in place within the casing, with a man represented along side the filter to give an idea of proportions. The flexible conduits by means of which the filter is connected to the outside pipe lines during operation are here represented as being disconnected.

Fig. 3 is an assembly view of a complete installation showing one method of connecting the filter with its auxiliary equipment for operation.

Fig. 4 is a fragmentary view of one end of the casing showing the manhole which provides convenient means for a man and supplies to enter the casing.

Fig. 5 is a sectional view of the valve located at the end of the filter and shows the respective position of ports to which communciation is established through the flexible hose connections shown in Figures 1 and 2.

Fig. 6 shows an end view of the casing provided with a lock through which a man may enter or leave the shell when desired without reducing the pressure in the casing.

Fig. 7 shows an end view of a modified form of casing wherein the joint of the casing is on a horizontal plane instead of a vertical plane. In this modified construction the filter would be placed in the casing or removed therefrom by means of a suitable crane instead of being slidably entered from the end as is the case in my preferred form.

Fig. 8 shows the same type of casing that is used in Figures 1, 2 and 3, but in this instance a drum type of filter is shown in side elevation in place of the American or disc type filter which is represented in the other views.

Fig. 9 shows a form of casing with a special arrangement for discharge of residues by means of a lock.

Figure 1:
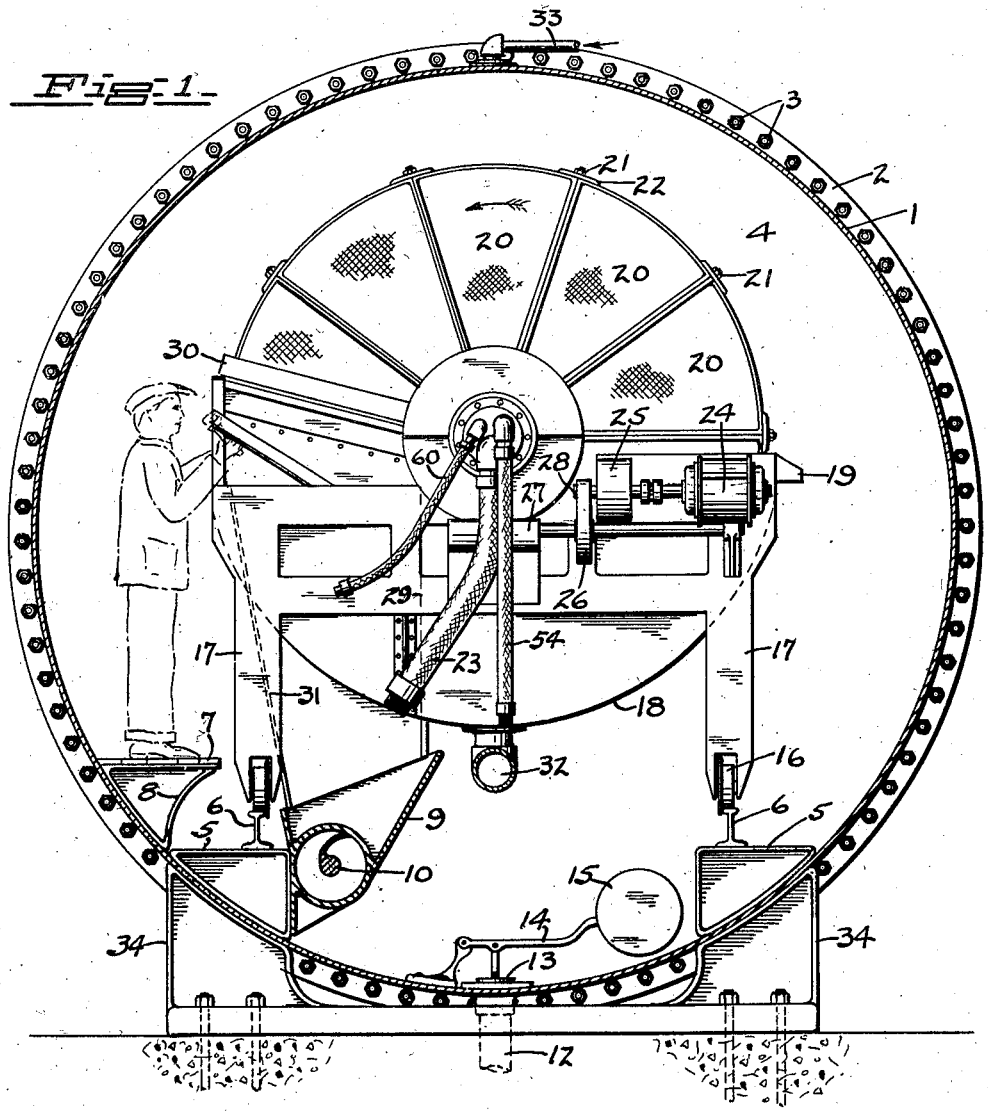

Referring to the details of construction and particularly to Fig. 1 the numeral 1 indicates a cylindrical steel casing provided with flange 2 against which a dished head or cover 4 is held to form an air tight seal by means of the bolts 3. Located near the bottom of the shell and on the inside thereof are bracket supports 5 upon which the rails 6 are mounted to form a track parallel to the axis of the cylindrical casing. A runway 7 mounted upon a bracket 8 provides a convenient place for a workman to stand while making repairs or adjustments. Rigidly mounted upon the side of the bracket 5 is a hopper 9 which is designed to receive the residual matter or cake which is discharged from the filter during operation. The lower portion of the hopper 9 is rounded to conform to the spiral screw conveyor 10, the purpose of which is to remove accumulated residues from the casing. At the bottom of the casing is a discharge pipe 12 which is provided with valve 13 actuated by the lever 14 and the float 15. This float valve arrangement automatically provides an exit for material overflowing from the filter as will be described in more detail later.

Mounted upon the rails 6 by means of the flanged wheels 16 is a type of filter well known in the art as the American continuous vacuum filter, and embodied for example in the United States Patent #1,259,139. As no invention pertaining to the details of the filter itself are herein claimed and as the machine is well known in the art minute description is not considered necessary. The main parts of this filter consists of the supports 17 upon which is mounted the tank or pan 18 which is supplied with an overflow spout 19. A plurality of discs are formed by the sectors 20 and these are held in position on a rotating center shaft by means of radial rods which terminate in the nuts 21 which bear against the sector clips 22. Each of these sectors is covered with a suitable filter cloth stretched over a drainage member in such manner that the filtrate may pass through the filter cloth and on through suitable ports in the center shaft and finally out through the hose 23. The center shaft with its discs formed by the filter-cloth-covered sectors are caused to rotate by means of the motor 24, the speed of which is reduced through gears contained in the housings 25 and 26 and finally through a worm in the housing 27 and wormgear in the housing 28. The left hand side of the pan 18 as shown in Fig. 1 is provided with a series of notches between the filter discs. These notches extend inward to the point indicated by the dotted line 29 and thus provide spaces for the residual cake which is removed from the discs by the scrapers 30 to fall into the hopper 9. These spaces are indicated by the numeral 29—A in Fig. 2. An apron plate 31 is provided to guide the falling residues into the hopper 9. The material to be filtered enters the pan 18 through the pipe 32. The pipe 33 is the inlet through which compressed air is admitted to create the desired pressure within the casing. The casing 1 rests upon supports 34 which are preferably arranged in line with the brackets 5 so that the weight of the filter will have no tendency to distort the shell or casing.

Figure 2:
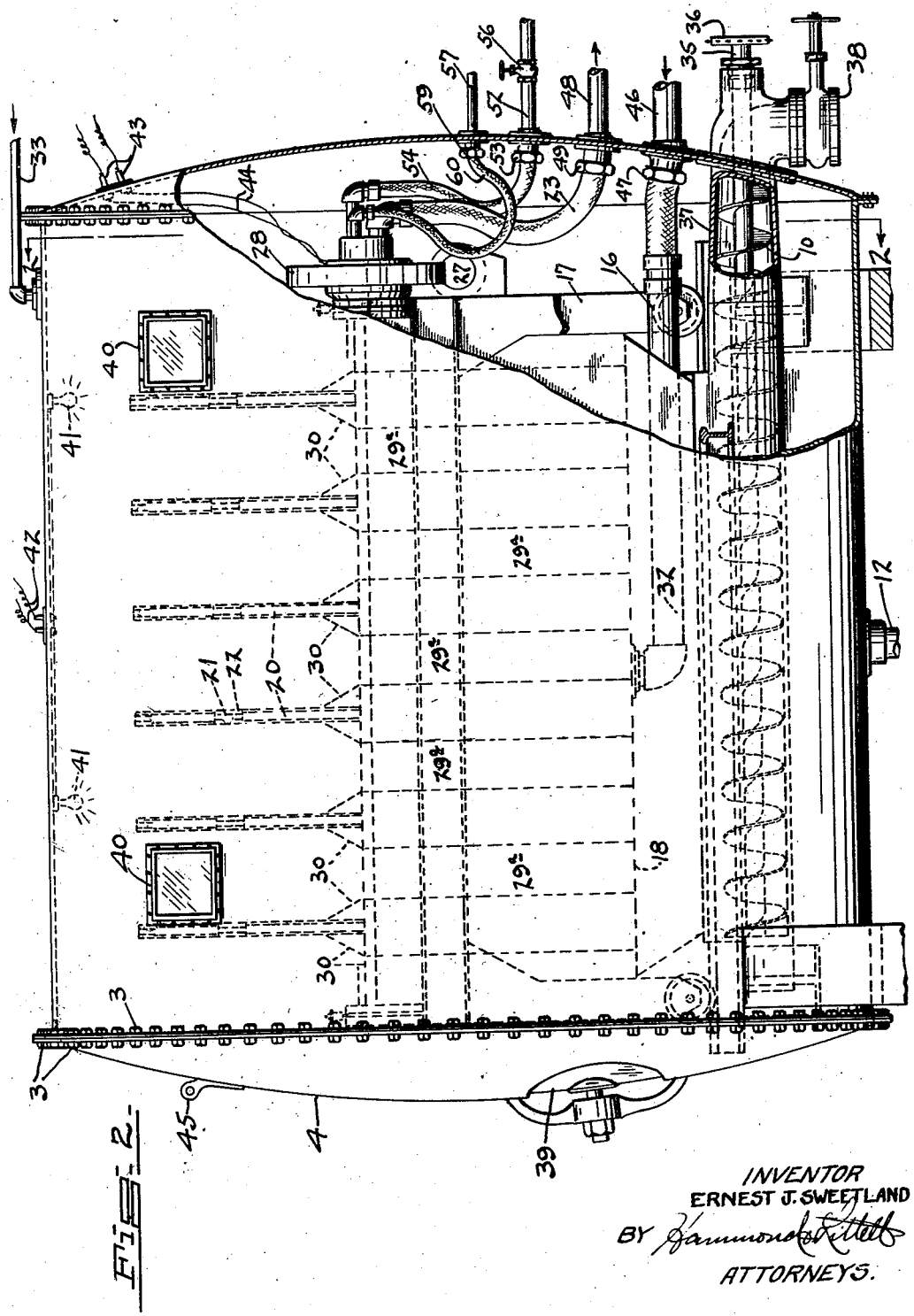
Fig. 2 is a side elevation of the casing represented partially in section and showing in dotted outline the American type filter represented in Fig. 1.

In Fig. 2 the side elevation of the American filter is shown and this view particularly shows the method of connecting the various conduits which have to do with the operation of the filter through the end of the casing. It will be noted that the screw conveyor is operated through the shaft 35 by means of sprocket 36 and that the screw conveyor 10, a greater portion of which lies in the open hopper 9, is slightly tapered at the discharge end and is enclosed near the end in the housing 37. A valve 38 is provided at the discharge end and this valve in conjunction with means of regulating the speed of the sprocket 36 provides for a variation in rate for discharge of residues as may be required to suit different materials. The spiral screw type of discharge apparatus is illustrated merely as representative of one type of apparatus which may be used for this purpose, and other devices such as a piston or intermittent opening gate may be employed without departing from the spirit of my invention. The manhole 39, windows 40, electric lights 41, and their attendant wiring 42 are shown in this view. The insulators 43 provide means for supplying power to the motor 24 through the wires 44. A lug 45 on the cover 4 is provided to facilitate handling the cover. The liquid to be filtered enters the casing through pipe 46 which by means of the union 47 is attached to pipe 32. Filtrate issues from the casing through pipe 48 which by means of the union 49 and hose 23 communicates with the portion of the valve which is indicated by the numeral 51 in Fig. 5. The pipe 52 through the union 53 and hose 54 communicates with the port of the valve shown in Fig. 5 which is indicated by numeral 55. This pipe is used for exhausting the moisture from the cake during the drying period and to prevent excessive loss of air through the cake, the valve 56 is provided. By throttling this valve the amount of air which escapes with the moisture may be regulated. Pipe 57 is for the admission of compressed air to the interior of the filter sectors to which it communicates through the space indicated by the numeral 58 in Fig. 5 by means of the union 59, and the hose 60.

Referring to Fig. 3 the air compressor 61 is assumed to be provided with an automatic unloading valve so that it maintains a pressure, say of 60 pounds per square inch in the tank 62. The pipe 63 enters the regulating valve which is diagrammatically represented by 64. The construction of this valve is such that it maintains a pressure, let us say, of 50 pounds per square inch in the tank 65. The valves 66, 67 and 68 are used only for convenience in case repairs are necessary. The liquid to be filtered is stored in the tank 69 and is pumped into the casing by means of the pump 70 which communicates with pipe 46. The pipe 12 which communicates with the float valve inside of the filter casing is here shown in position to return back to the tank 69 any liquid that might be discharged through the float valve 13. In some cases it may be desirable to make the shell somewhat smaller in proportion than that shown in Fig. 1 for purposes of economizing in first cost of the tank, and in this instance ample working room would not be provided within the shell and it would be desirable to remove the filter from the shell if extensive repairs were needed. To facilitate removal of the filter in such cases I provide rails 71 supported upon a suitable structure 72 and these rails are made to align with the rails 6 within the casing. This arrangement makes it possible when the head is removed to insert two short rail sections to connect the rails 71 with the rails 6, and the filter in its entirety may then be rolled out of the casing for any purpose whatever.

Referring to Fig. 5 it should be understood that each row of sectors 20 communicates with a conduit extending throughout the length of the shaft and communicating with a port in the valve at the end of the filter. For example all of the sectors along the line indicated by the letter "A" in Fig. 5 communicate with the port "A" in the valve. Those indicated by the letter "B" communicate with the port "B" of the valve, and those indicated by the letter "C" with the port "C" of the valve and so on. The inner member or plug of the valve 74 is the member to which the hoses 23, 54 and 60 are connected and this member remains stationary during the operation of the filter. The outer portion of the valve 75 rotates with the shaft. It will therefore be seen that as the shaft and its filtering discs rotate in counterclockwise direction the various rows of sectors progressively come into communication with the ports in the plug of the valve indicated by the numerals 51, 55 and 58.

Fig. 6 shows the details of a lock at the end of the casing. This consists of the small casing 76 which is connected to the end of the casing 1. A man may enter this casing through the manhole 77 after which it is closed and the pressure in casing 76 is gradually brought up to a pressure equal to that within the casing 1. When this time arrives the manhole 39ª is opened and the man enters the casing, and after performing his mission returns through manhole 39ª, which he then covers and the pressure is gradually relieved from casing 76 through the valve 78 until it has reached atmospheric pressure. He may then exit through manhole 77.

Fig. 7 shows a horizontally divided casing 1ª—1ᵇ.

The drum type of filter 88 shown in Fig. 8 is operated upon the same principles as those employed in operating the American type filter shown in the other figures, and the procedure will be obvious to those skilled in the art after, having familiarized themselves with the technique of operating the American type filter.

Referring to Fig. 9 there is attached to the end of the casing 1 a large pipe connection 80 to which is attached a valve 81 and a tank or lock 82. This tank is provided with a cone bottom 83 which terminates in the door 84 which swings on hinge 85 and by means of a gasket makes a tight joint with the lower end of the cone 83. A suitable link 86 holds the door to form a sealed closure for the bottom of the tank. An air inlet valve 87 permits the use of compressed air for discharging the cake from the tank 82.

Method of operation

It should be understood that the normal method of operating the American continuous suction filter herein described is substantially as follows:

Suction is applied to the hose 23 while the filter discs are rotated at a rate, let us say, of one revolution in three or four minutes. The lower portion of the discs being submerged in the liquid to be filtered the filtrate is drawn through the port 51 (Fig. 5) causing a deposit of cake to form upon the filter surfaces. In this instance suction is also applied to the hose 54 and communicates with the interior of the filter sectors through the port 55. This suction through hose 54 causes a partial drying of the deposited cake as it progresses in its revolution until the sectors come in communication with the port 58 which is supplied with compressed air through the hose 60. The reverse current of compressed air thus produced causes the filter cloth to swell out and discharge the cake which is scraped off of the cloth by means of the scrapers 30 and the cake then drops down through the spaces 29ª of the pan 18 and are carried away from the filter by any convenient means. Operating under these conditions filtration is induced only by the differential between atmospheric pressure and the rarified condition produced within the sectors by the partial vacuum produced by the suction pump. Under normal conditions the suction produced yields an effective filtering pressure equal to only ten or twelve pounds per square inch. On account of this comparatively low filtering pressure it is necessary to revolve the discs very slowly and even then such a filter is applicable to only free filtering material.

In operating the same filter under the method herein described and claimed, I am not dependent upon atmospheric pressure but create artificially high pressure in the atmosphere surrounding the filter so that if a pressure of 50 pounds per square inch is maintained within the casing which surrounds the filter the rate of rotation may be greatly increased and the production of the filter multiplied accordingly.

The operation of the apparatus by my invention is as follows:

Tank 62 being maintained at a pressure, say, of 60 pounds per square inch or more, and valves 66, 67 and 68 being opened, the special regulating valve 64 functions in such manner as to maintain a uniform pressure of, say, 50 pounds per square inch within the casing 1 and a pressure of, say, 55 pounds per square inch in the tank 65. The pump 70 is started in operation, pumping the liquid to be filtered from tank 69 into the filter pan 18 until the latter begins to overflow through the spout 19. At this point the motor 24 is started in operation causing the filter discs to rotate in counter-clockwise direction at the rate, say, of one revolution per minute. Since the pipe 48 which carries away the filtrate is open to the atmosphere, discharging the filtered liquid into any convenient receptacle, there is a difference in pressure between the interior of the filter elements and the exterior of same equivalent to 50 pounds per square inch and this causes the filtrate to discharge at a rapid rate through pipe 48. As the filter elements rotate they pass out of communication with the port 51 of the valve represented in Fig. 5 and advance with a load of deposited filter cake into communication with the port 55 of the same valve. At this stage the sectors are out of submergence but are surrounded by compressed air at 50 pounds pressure per square inch, which forces its way through the cake carrying the excess moisture with it, and this mixture of moisture and compressed air discharges through the pipe 52, the valve 56 being regulated so that an excessive amount of compressed air does not escape. During this phase of the cycle the cake is dewatered as far as it may be by filtration methods. The sectors advance out of communication with the port 55 and into communication with port 58 which is continuously supplied with compressed air from the tank 65 through the pipe 57 at a pressure a few pounds per square inch higher than the pressure within the casing. This unbalanced pressure results in a reverse current of air passing through the filter cloth on the sectors, causing the filter cloth to bulge outwardly so that it is brought into bearing with the scrapers 30 and the cake is thus discharged from the cloth and falls into the hopper 9. The air which is thus discharged through the filter cloth tends to replenish the compressed air which is exhausted through pipe 62 and valve 56.

It is assumed, of course, that while the machine is in operation the sprocket 36 is being caused to rotate the screw conveyor 10 and the residual cake is thus discharged from the filter casing through valve 38 which is regulated to give the proper rate of discharge. The housing 37 through which the screw 10 operates is naturally kept plugged with residual cake which is compressed by the action of the screw and thus prevents the escape of compressed air through the valve 38.

The discharge of the pump 70 is regulated either manually or automatically so as to maintain the proper liquid level in the pan 18 and under normal conditions would be so regulated as to maintain a slight overflow through the hopper 19 and the excess unfiltered material which overflows is in turn discharged by the float valve 13 through the pipe 12 and returns back to the tank 69.

If desired, the motor 24 may be mounted outside of the casing, in which event the power for rotating the filter would be transmitted through a suitable shaft passing through a stuffing box which would preferably be located on the head of the casing adjacent to the drive gears.

When operating by means of the apparatus shown in Fig. 9 the screw conveyor 10 discharges the residues through the pipe 80 and valve 81 into the tank 82 which normally would be designed to hold several tons of residues. When it is desired to discharge these residues the valve 81 is closed and the air in this tank is exhausted through the valve 87 after which the door 84 is opened and the residues discharged into a car or other suitable receptacle. The door 84 is then closed and locked and valve 81 opened and the operation continues. Obviously, two or more locks of this character could be attached to the shell if desired, so that one could be discharged while the other is filling.

The operation of washing the cake on the American filter or on the drum type of filter by means of sprays playing upon the cake deposited on the sectors 20 may obviously be employed in connection with my process by simply mounting suitable spray nozzles in proper relation to the filter sectors, and forcing water through them from the outside of the casing at a pressure in excess of 50 pounds per square inch. As this step appears to be obvious it has not been thought necessary to complicate the drawings and specifications with this feature, although such a washing operation is clearly within the purview of this invention.

It is also within the scope of this invention to employ a rotating type of filter having an intermittent motion as described in my U. S. Patent No. 1,432,134 issued October 17, 1922, or modifications thereof, if desired.

Many modified forms of casing and of auxiliary apparatus may be employed without departing from the spirit of my invention, and I do not wish to be limited to the specific constructions herein shown and described.

While under ordinary conditions the gas which would be compressed within the casing would be ordinary air I reserve the right to employ any other gas that may be advantageously used in connection with any particular filtration process. For instance in certain processes it may be desirable to employ nitrogen or carbon dioxide or other gas which would tend to prevent oxidation of the materials under treatment in the filter. In other cases a special gas such for instance as sulphurous gas for the purpose of providing a bleaching effect or to promote some desired chemical reaction may be employed.

Wherever the term "suction filter" is used in the following claims it is intended to mean any type of filter which is designed and normally intended to be used with a suction pump, or other means of creating a partial vacuum in the interior of the filter elements for the purpose of drawing filtrate through the filter cloth. Such filters are sometimes called "vacuum filters", and in some installations a wet vacuum pump is used, which draws the filtrate directly through the pump, and in other cases a dry vacuum pump is used to exhaust a receiving tank into which the filtrate flows. As any of these types may be used in conjunction with my invention the term "suction filter" in the following claims is intended to embrace all types of filters of this class whether they are specifically described herein or not.

Having thus described my invention, what I claim is:

1. A method of operating filters which consists in placing a self-contained continuous filter having an independent mounting within a separate casing and surrounding said filter with compressed air during its operation.

2. A method of operating filters which consists in installing a complete suction filter having an independent mounting within an enlarged separate sealed casing and causing it to operate by surrounding the entire filter with a gas under pressure.

3. A method of operating a filter designed and built to operate normally as a continuous rotary suction filter having an independent portable mounting which consists in enclosing said filter within a sealed separate casing and surrounding the entire filter mechanism with gas under pressure.

4. A filter room comprising a shell, a continuous vacuum rotary filter, a normally sealed closure of such size as to admit the installation of said filter, said filter having a tank surrounding the lower portion of the filter elements for containing the liquid to be filtered, and said tank being independent of the filter casing and means to place said filter in or out of said shell as desired.

5. A filtering apparatus comprising an air-tight casing adapted to receive a complete portable filter unit and of such proportions as to allow working space for a man between the walls of the casing and the filter parts, a normally sealed door through which a man may enter the casing, said filter unit being of the type normally operated by vacuum and operable under super-atmospheric pressure in said casing.

6. An air-tight filter casing, a portable rotary vacuum filter within the casing, means for continuously operating the filter at a super-atmospheric pressure by means of a compressed gas surrounding the filter, means to bodily remove said filter from said casing and means to operate under vacuum conditions.

7. A filter apparatus comprising an outer air-tight casing surrounding a rotary filter unit having a portable mounting, said casing being independent of the operable unit, a tank within the casing for containing the liquid to be filtered, a space between said tank and said casing, means for maintaining a uniform gas pressure within the casing and means for removing solids from said casing without affecting the pressure.

8. A filter casing having a rotary filter unit of the class described, portably mounted within the casing, a tank for holding the liquid to be filtered within the casing and a valve within the casing for progressively opening and closing communication between the various filter elements, and a conduit passing thru a wall of the casing.

9. An air-tight room adapted to receive a filter installation, said installation including an integrally complete operable suction type filter, means for maintaining gas under pressure within the room, a sealed closure whereby a man may enter or leave the filter room, and space within said room to permit a man to work between the walls of the room and the filter installation.

10. An air-tight room adapted to receive a suction filter installation having a portable mounting, said room including a large cylindrical chamber and removable head thereon, means for maintaining gas under pressure within the room, a sealed closure whereby a man may enter or leave the filter room, space within said room to permit a man to work between the walls of the room and the filter installation, and means for removing residue from the room without the escape of said gas under pressure.

11. An air-tight filter casing having a complete suction type filter portably and independently mounted therein, and having the operating parts of said filter built independently and separately of said casing.

12. A filtering apparatus comprising a separate air-tight casing and a sealed door for said casing and a complete filter unit of the so called suction type having an independent portable mounting, mounted within said casing, and means to operate said filter either in or out of the casing.

13. A filter apparatus comprising a separate outer shell having a self-contained filter unit of the so-called suction type removably mounted therein and having a tank in which a plurality of filter elements are caused to revolve, said tank being constructed independently of the outer casing.

14. A filtering apparatus comprising an outer casing having a substantially complete filter unit of the continuous rotating type slidably mounted within the casing, a door upon one end of the casing to permit the filter unit to be slidably removed from said casing in a horizontal direction, means to seal said door against filter pressures and means to operate said filter under pressure or vacuum.

15. Means for converting a suction or vacuum filter to a pressure filter having an independent portable mounting which comprises a separate casing, means in said casing to receive a vacuum filter, means to removably position the vacuum filter in said casing, means to seal said casing and means to introduce a pressure medium therein to permit pressure operation of said filter.

16. A filter room for converting a vacuum filter to a pressure filter, a rotary vacuum filter unit, a shell substantially larger than said unit, a support within said shell adapted to serve as a mounting for said filter unit, a plurality of conduits leading through the shell connected to a valve which forms a part of the filter, and means to make said shell pressure tight.

17. A filter room for converting continuous vacuum filters to pressure filters which comprises a shell, suitable brackets therein upon which a complete filter of the vacuum type may be removably mounted, means within the shell and independent of the filter for receiving the residues from the filter, means for discharging them from the shell, and means to seal said room.

18. An article of manufacture, a filter room for converting vacuum filters to pressure filters comprising an enlarged casing, a removable end, means to secure said end to said casing to render the casing substantially pressure tight, said casing being of such size as to receive a continuous vacuum filter, and means in said casing walls to exteriorly connect said enclosed filter for pressure operation.

19. A filter casing having a rotary filter unit of the class described operably mounted within the casing, a tank for holding the liquid to be filtered within the casing and a valve operable from within said casing for progressively opening and closing communication between the various filter elements and a conduit passing thru the wall of the casing.

20. In a filtering apparatus of the type described including a continuous filter having a sludge compartment, a filtering portion movable thru the sludge compartment and a pressure casing independent of said sludge compartment adapted to surround said filter and sludge compartment and to permit operation of said filter at a superatmospheric pressure.

21. In a filtering apparatus of the type described including a continuous filter having a sludge compartment, filter elements movable thru the sludge compartment and a pressure casing independent of said sludge compartment and flexible connections between said filter extending outside said pressure casing to permit operation of the filter at superatmospheric pressure means.

22. In a filtering apparatus of the type described including a continuous filter having a sludge compartment, filter elements movable thru the sludge compartment, a pressure casing independent of said sludge compartment adapted to surround said filter and sludge compartment, said continuous filter being provided with rollers and said pressure casing being provided with rails cooperating with said rollers whereby said continuous filter may be placed in or out of said pressure casing.

23. An airtight filter casing having a complete suction type filter mounted therein, the operating parts of said filter being built independently of said casing and including a float valve controlling the height of liquid in the outer casing and independent of the level of liquid in the filter proper.

24. An airtight filter casing having a complete suction type filter mounted therein, said filter including a driving motor entirely enclosed and within the separate airtight filter casing.

25. In a filtering apparatus of the class described a continuous filter having a sludge tank, filter elements operating in said sludge tank, means for removing the filter cake from said elements, a receiving chamber for said cage external of said filter, a separate airtight casing independent of said sludge tank and entirely surrounding said filter and said discharge chamber, said chamber being of such capacity that it will permit substantial accumulation of cake between the discharge elements of the filter and said casing.

26. An airtight filter casing having a complete suction type filter mounted therein, said filter having a sludge tank, an overflow from said sludge tank, a float valve controlling the liquid level in said filter casing, said float valve and said overflow maintaining a substantially constant level of sludge in the sludge tank.

27. In a filtering apparatus of the type described including a continuous filter having a sludge compartment, filtering parts movable thru the sludge compartment, a pressure casing independent of said sludge compartment adapted to surround said filter and to permit operation of the filter under superatmospheric pressure and a pressure lock in communication with said pressure casing adapted to receive the discharge filter cake without loss of pressure.

28. An airtight filter casing having a complete suction type filter mounted therein, means to discharge filter cake from said filter into said separate airtight casing and a pressure chamber in communication with said separate casing adapted to receive said discharge cake under pressure and without loss of pressure in said separate casing.

29. An airtight filter casing having a complete suction type filter mounted therein, means to discharge filter cake from said filter into said separate airtight casing and a pressure chamber in communication with said separate casing adapted to receive said discharge cake under pressure and without loss of pressure in said separate casing, said pressure lock being provided with a conical bottom and a pressure discharge pipe to facilitate discharge of large quantities of residue.

30. In a filtering apparatus of the class described, the combination of a suction filter having a sludge tank, filter elements adapted to pass thru said sludge tank, a motor to drive said filter elements, a discharge mechanism to remove the filter cage from said filter elements, and a separate airtight pressure casing completely surrounding said suction filter and independent of said sludge tank, flexible connections between the wall of said pressure casing and said suction filter, a valve mechanism on said filter, roller means to permit the movement of said suction filter into and out of said pressure casing, a sludge discharge receiving chamber in said pressure casing adapted to receive the filter cake from said suction filter, a pressure lock in communication with said pressure casing adapted to receive said discharge filter cake without loss of pressure from said casing, said pressure casing having a window whereby operation within said pressure casing may be observed externally, said pressure casing being of such size that a man may be accommodated within said casing during the operation of said filter and means entirely within said casing to maintain a substantially constant level of sludge in the sludge tank.

31. The method of maintaining a constant sludge level in the sludge compartment of a continuous pressure filter which comprises providing an overflow outlet at the desired level and pumping sludge through the sludge compartment at a sufficient rate to maintain a slight overflow at all times.

32. In a continuous pressure filter installation, a sludge compartment, filter elements movable through the sludge compartment, means to maintain superatmospheric pressure on said filter elements and on the sludge in said compartment and means to maintain a constant level of sludge in said compartment, comprising means to force sludge into the compartment at a pressure greater than the filtration pressure and an overflow from said compartment through which the excess sludge flows out at the level of said overflow.

In testimony whereof I have affixed my signature to this specification.

ERNEST J. SWEETLAND.